June 23, 1936.   E. E. TURNER, JR   2,044,820
APPARATUS FOR MEASURING DEPTHS
Original Filed April 17, 1928   3 Sheets-Sheet 3

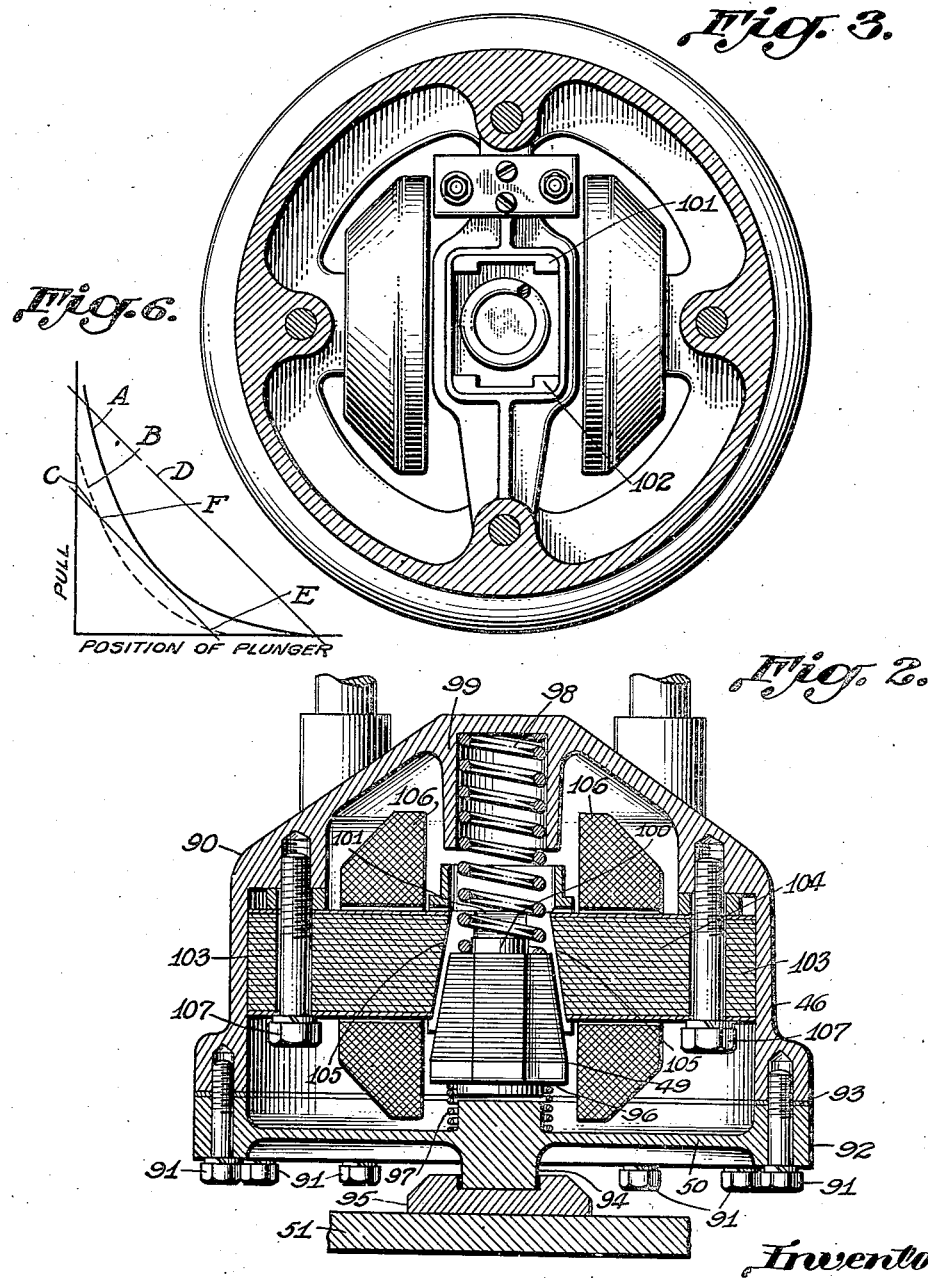

Inventor:
Edwin E. Turner Jr.
by
Attorney

Patented June 23, 1936

2,044,820

UNITED STATES PATENT OFFICE 2,044,820

APPARATUS FOR MEASURING DEPTHS

Edwin E. Turner, Jr., West Roxbury, Mass., assignor to Submarine Signal Company, Boston, Mass., a corporation of Maine Original application April 17, 1928, Serial No. 270,660. Divided and this application February 25, 1930, Serial No. 431,304. In Denmark July 16, 1928

6 Claims. (Cl. 177—386)

This application is a division of my copending application Serial No. 270,660 filed April 17, 1928.

The present invention relates to distance finding, and more particularly perhaps, depth finding by the time of travel method employing a source of sound and a time measuring device for measuring the time interval between the emission of the sound signal and the return of the echo from the bottom of the ocean or the reflecting surface.

The present system contains many advantages over the prior art, both in the ease of obtaining the desired results with a minimum of apparatus with regard to cost, and also with very great accuracy.

As contrasted with some of the prior methods of depth sounding, the present system employs a hammer striker which is designed to have a high damping and decrement, not so much to prevent continued vibration of the sounder as to provide a device which cooperates with the particular receiving circuit, which also has a high decrement, as will be explained below. The circuit is similar to the one shown in my copending United States application Serial No. 220,719, filed September 20, 1927.

The circuit shown in the above mentioned application operates only on a rapid change of current and only once until it is restored. To accomplish this the decrement of the signal must be high and similar to that of the receiving circuit. This is provided by a single powerful impact which has a definite force. This single sound impact, when echoed, acts on the receiving circuit and causes the transient phenomenon which operates the indicating mechanism.

Not only is it possible to eliminate stray signals, since only this particular type of impact is capable of operating the receiving circuit, but it is also possible to obtain more accurate measurements than heretofore since, instead of having to build up the signal received by one or two oscillations, as was formerly necessary in many cases and perhaps in all cases, the present signal receiver will operate on the single impact, which definitely fixes the time of the receipt of the echo or received signal.

Besides this, the present type of mechanism eliminates all need of high frequency generators and elaborate switchboards to run oscillators, so called, which have been used to create sustained but short vibrations in this work.

The present system is designed chiefly for stability, long life, low cost, few repairs, something which can be installed upon a vessel and run continuously, if desired, by unskilled operators and give excellent results.

Without enumerating all the advantages and features of this new system as they will appear from the description below, the embodiment will now be described as shown in the drawings, in which:

Figure 2 shows a vertical section through the striker;

Figure 3 shows a top plan view in section of the striker with the outer casing removed;

Figure 6 illustrates a feature of the design of the striker.

Figure 1:
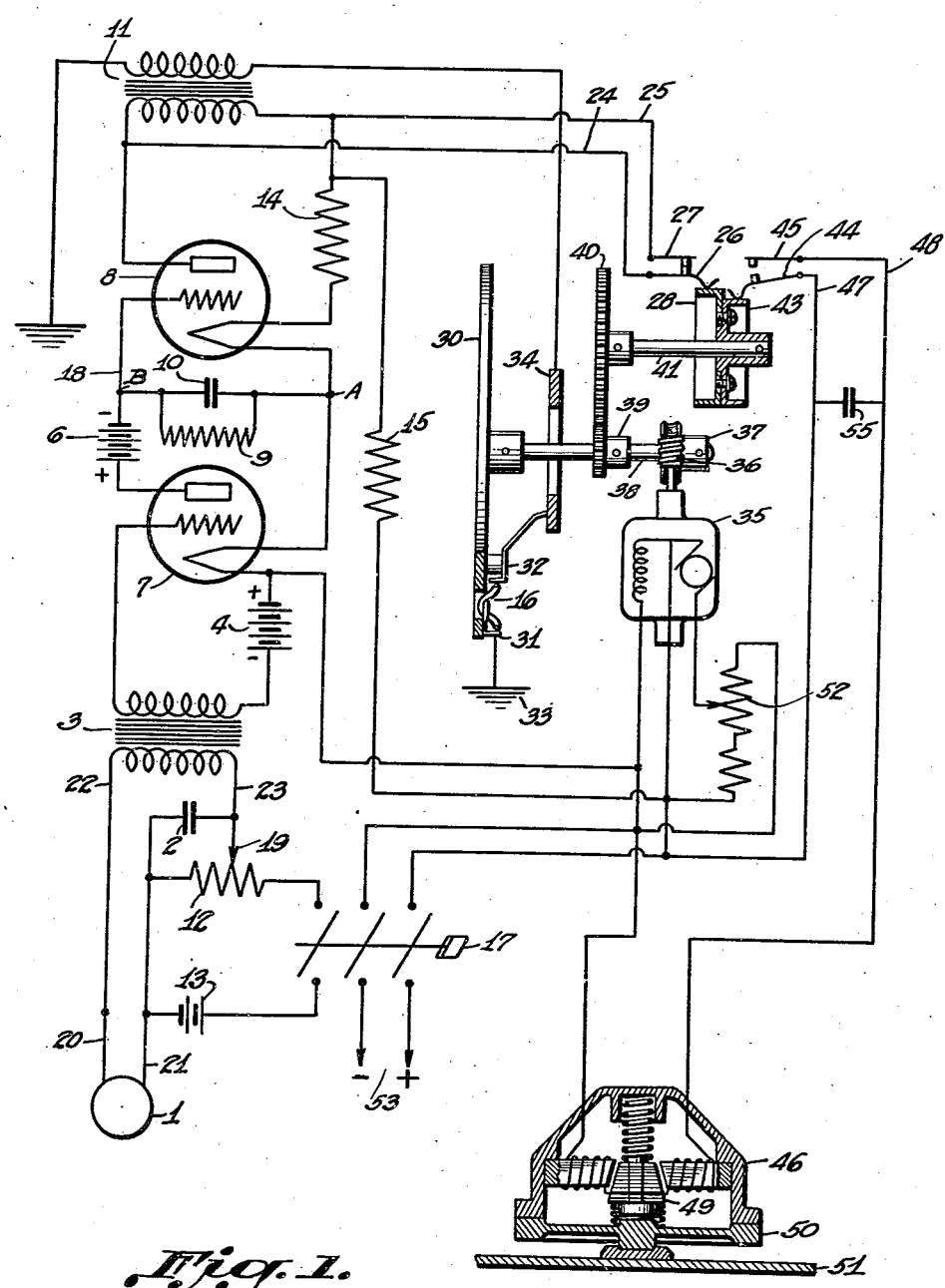
Figure 1 represents a diagrammatic view of the entire system.
Figure 5:
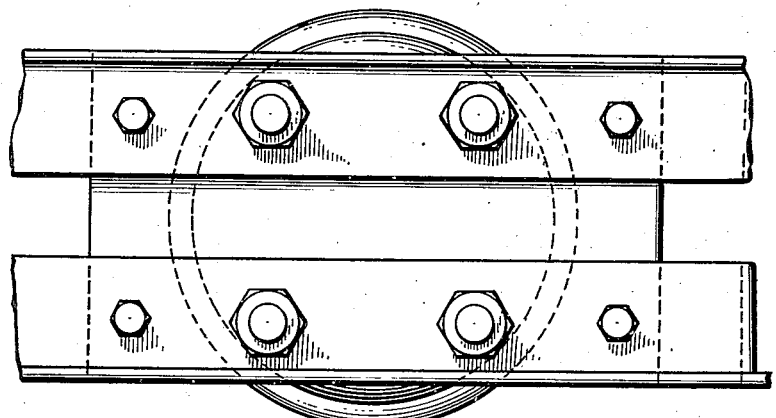
Figure 5 shows a detail of the mounting.
Figure 4:
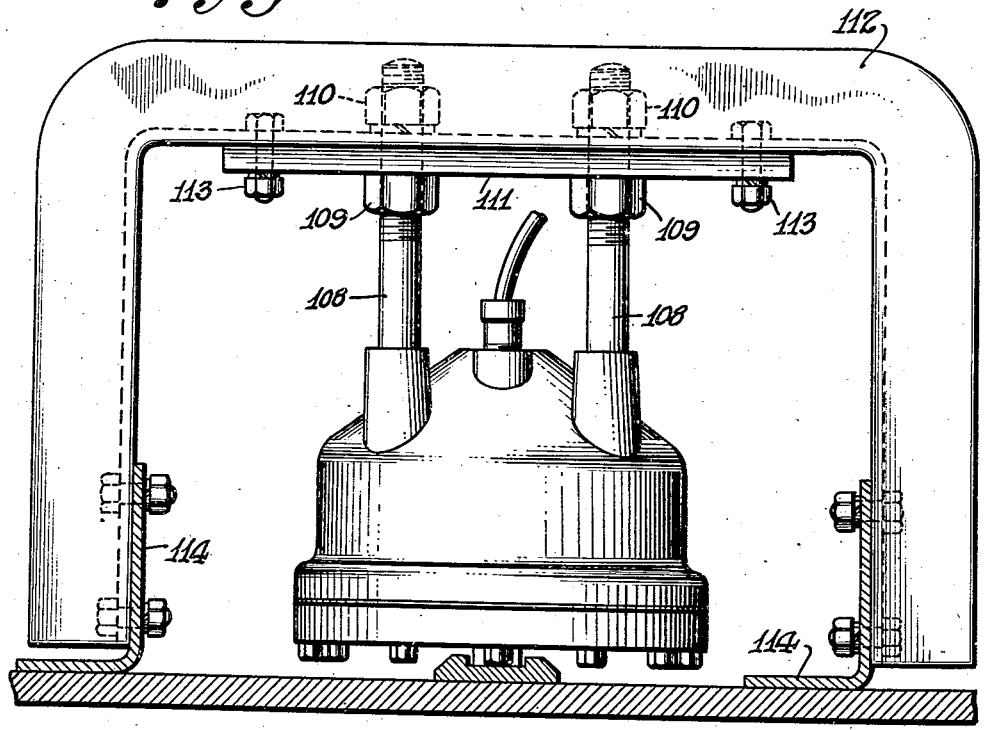
Figure 4 shows the mounting of the striker.

In Figure 1, 1 is a hydrophone or other sound receiver capable of receiving the sound impulse for ultimately operating the indicator 16. Connected across the hydrophone 1 is the primary of a transformer 3, one lead 22 of which connects directly to a terminal 20 of the hydrophone 1, while the other lead 21 is connected through an adjustable direct current source 13 in the following manner. The battery 13, when the switch 17 is closed, is connected across the potentiometer 12, one side of the potentiometer and the battery being electrically connected to the hydrophone terminal 21. The potentiometer arm 19 is connected to the other terminal 23 of the transformer 3. This arm is also shunted by a condenser 2 to the terminal 21 so that any pulsating variations due to the moving of the potentiometer arm 19 back and forth are not reproduced or indicated upon the indicator 16. The use of the potentiometer in this connection allows a careful adjustment of microphone current, which is found very advantageous in getting just the right current for operating the receiving circuit.

The secondary of the transformer 3 has one lead connecting directly to the grid of the vacuum tube 7, while the other connects to the filament of the same tube through the battery 4, which places a negative potential upon the grid with respect to the filament. The plate of the tube 7 is maintained at a positive potential with respect to the filament by means of the battery 6, which has its positive side connected to the plate and its negative side connected to the filament through the resistance 9 and condenser 10 connected in parallel. The negative side of the battery 6 is also connected with the grid of the tube 8, while the filaments of the two tubes, it will be noted, are connected in series with the resistances 14 and 15, across the direct current power lines. The potential across the resistance 14 serves to make the plate of the tube 8 positive by that amount with respect to the filament. The transformer 11 is connected in the plate circuit of the tube 8 and serves as the output transformer for the circuit. The primary of this transformer is connected by the leads 24 and 25 to the contacts 26 and 27 respectively and is shorted as shown in Figure 1 for a certain period in the revolution of the cam 28, which is at all times except after the sound has been emitted.

The operation of the circuit is the same as that of the operation of the circuit shown in my Patent No. 1,991,430.

When the impulse is received by the receiver 1, it is transmitted through the transformer 3 and made to impress a potential upon the grid of the tube 7. When this potential is in the right direction, which in the present circuit is positive, the plate filament current in the tube 7 will increase, and consequently the potential of the point B will drop below the potential of the point A. The grid of the tube 8, which up to this point was the same potential as the filament, will now become negative with respect to it, and if this change is sharp and of the desired intensity, it will instantaneously cut off the plate current in tube 8.

A rapid breaking or reducing of the plate current in the tube 8 will cause a large voltage across the transformer 11 and compel a breakdown across the indicator 16 which is connected across the secondary of the transformer 11. The indicator 16 is preferably a neon tube which gives an instantaneous glow when an electrical discharge takes place across the electrodes in the tube.

Not every type of signal will operate the indicator, because the receiving circuit used is such that the signal must have a steep decrement in order to effect a rapid enough change to induce the proper voltage in the brief time of the taking place of the phenomenon. In the present case, unless the change of potential on the grid of this tube 7 is rapid, the change in the plate current of the tube 7 will not be rapid, and as a result the charge on the condenser 10 may begin to leak off before the phenomenon is complete. The design of the circuit is such that unless the change in the plate current of the tube 7 is very rapid, the potential of the point B with respect to the point A will not decrease sufficiently or sufficiently quickly to cut off or induce a large potential across the transformer 11.

One of the remarkable features of the circuit is that it may be so designed and adjusted that its decrement corresponds to that of the sounder and that water noises or other signals will not cause an indication. Whereas in other depth sounding systems there are frequently many strays present, in the present invention this is practically eliminated, since a sound which does not have the same sharpness or decrement as the one for which the circuit is designed will not be received.

An added feature in the present combination is that the receipt of the signal is one of a single phenomenon and not a steady state condition. That is, the first impulse operates the receiving circuit, if at all, and if it does, the second vibration cannot operate the circuit, since it takes time for the circuit to recover after operation. It is known, therefore, within a single vibration between what points the indicator measures. This is borne out by the steadiness with which the indicated signal in actual measurement stays at one place on the scale when the ship is stationary in still water.

The indicator is mounted on a rotating disc 30 by means of a pair of clips 31 and 32 in a small slot near the edge of the disc. One of the clips 32 serves also as a brush for conducting the signal to the rotating disc. The other clip is grounded to the disc, which is grounded to the frame of the case as indicated by 33 in Figure 1. The clip and brush 32 bears upon the conducting ring 34, which is fixed and which connects to one side of the secondary of the transformer 11, the other side of which is also grounded to the frame of the case of the indicator.

The disc 30 is rotated by means of the motor 35, by means of the worm 36 and the gear 37, the latter being mounted and fixed to the shaft 38 carrying the disc 30. The shaft 38 also carries the gear wheel 39, which meshes with the gear wheel 40. The gear wheel 40 carries a shaft 41, upon which is mounted the cams 28 and 43 for controlling the operation of the sounding mechanism.

The disc is designed to make three revolutions to one of the cams 28 and 43. The cam 28 controls the indicator and short circuits it at all times except after the sounder has emitted its signal and until just before the contacts 44 and 45 close. It takes, therefore, three revolutions of the disc 30 to complete a sounding cycle.

During substantially two revolutions of the indicator it is made non-operative and during these two revolutions the hammer is pulled up and allowed to drop, whereupon the contacts 26 and 27 are opened immediately. The position of the cams shown in Figure 1 is when the striker has sounded and the indicator has not yet been made operative. The indicator is made operative depending upon the spacing of the sounder and receiver at the moment when the direct signal at the receiver has just passed by. In this manner the effect of the direct signal is entirely eliminated.

At the moment when the contacts 44 and 45 are closed, if the switch 17 is closed current will be impressed upon the sounder 46 by means of the leads 47 and 48. When these contacts are again open, the hammer 49, which had been previously drawn up, will be released and strike the diaphragm 50, imparting through impact a vibration to the diaphragm 51, which may be the skin of a vessel. A condenser 55 is provided for preventing the sparking across the contacts 44 and 45. The motor 35 has its armature connected across a potentiometer 52, which in turn is connected across the power supply line 53.

The striking mechanism is shown in detail in Figures 2, 3, 4 and 5. It is also shown in Figure 1. It comprises a diaphragm 50, which is held securely against the edge of a casing 90 by means of the machine bolts 91 which pass through a heavy flange 92 at the edge of the diaphragm. Between the casing and the flange 92 is a watertight gasket 93 to keep out the water from the interior of the casing, if necessary, although it is designed to operate in air with the diaphragm imparting the impulse to the ship's skin, as will be explained below.

At the center of the diaphragm is a boss 94 which extends on both sides of the diaphragm. On the outside it sets in a cap 95 which rests, without being rigidly held, against the ship's skin 51. On the inside it has a flat surface opposing the striker 49, which latter element in its operation hits the boss 94 to impart a sound vibration to the skin 51 and thereby to the water. Between the collar 96 and the shoulder of the boss 94 rests a helical spring 97 which is designed so that the forcing helical spring 98 will cause one blow to be given to the diaphragm and no more. The resistance of the spring 97 is just strong enough to prevent a second blow. The forcing spring 98 rests in a cup 99 at the top of the casing and bears against the striker 49. The spring is centered on the striker by the core 100. The striker 49 rests in ways or grooves 101 and 102, shown clearly in Figure 3. This maintains it in a central position for operation.

A laminated core 104 is made up of the laminations 103, which are circular stampings having two radial projections to form the poles 105, 105 across which the magnetic flux flows. The laminations are held together and to the casing by means of the machine bolts 107. Two solenoid coils 106, 106 are provided for generating this flux. When current is passed through the coils, the space between the poles becomes strongly magnetic and draws up the striker 49 against the spring 98. When the current is released the spring 98 forces the striker down against the boss 94 which imparts a blow to the ship's skin 51 and thus to the water.

The diaphragm 50 is made very thin and the spring 97 just strong enough to prevent a second impact of the striker against the boss 94. The clearance between the striker 49 and the boss 94 is small, yet of sufficient size to allow the striker an acceleration before hitting the diaphragm 50. The diaphragm is not set firmly in the piece 95 nor is the latter held firmly against the ship's skin 50, so that the impact may be sharp and not opposed before its full force is impressed on the skin 51. These features allow an impact having a sharp decrement to be obtained.

The advantages of this method of mounting an impact oscillator are probably not fully understood but it may be stated that this is the structure actually employed and it has proved to be of considerable utility in preventing the reaction of stray signals upon the receiver. It is believed that the element 95 is a sufficiently free element to avoid transmission of sounds of small amplitudes which may persist in the diaphragm 50. It is also true that by presenting a broader surface to the skin of the vessel, the impact is sharper on account of the damping effect.

Another feature of the striker is illustrated in Figure 6.

In the design of the ordinary striker, it has been found that the mechanism will operate fairly well for a time and then it will stick. This is due to the change in temperature of the mechanism which causes the copper to heat and cuts down the effective current. The magnetization is, therefore, reduced and whereas initially the curve of the pull of the magnet plotted as ordinate against the position of the plunger is the curve A, after continuous operation it may be and sometimes is the curve B. The curve representing the resultant force of the spring forces is a straight line obeying Hooke's law and is shown at C. It will be noted that while the curve A is continuously above the line C, the curve B drops below it, which means that between E and F the resultant force of the springs is in excess of the magnet pull on the plunger. The magnet cannot pull the plunger up and it will therefore stick.

To avoid this difficulty and to obtain, as well, a constant resultant force, the coil and magnetic circuit are designed so that the flux curve will always be above saturation, as shown by the curve D. By running above saturation, the force curve becomes a straight line and is everywhere above the resultant spring force, so that the magnet never sticks. This insures reliable and at the same time accurate operation of the sound producing means.

It is necessary in the present system to have special means for mounting the striking mechanism, as the contact of the boss 94 and the piece 95 against the skin of the vessel need adjustment in each case. For this purpose, the sound producer is provided with four threaded studs 108 which extend from the top of the sound producer casing and which are provided with nuts 109 and 110. The studs 108 pass through a plate 111 which is bolted to the angle iron 112 by means of the bolts and nuts 113 and the nuts 109 and 110. The nuts 109 may be adjusted along the stud to obtain just the right tension of the boss 94 and the piece 95 against the ship's skin. The nuts 110 are brought up tight with split washers beneath them, so as to hold the sound producing mechanism rigidly in place. Two angle irons 112 are used to hold the sound producer and these are bolted to the frames 114 or otherwise secured to the vessel.

Without going further into the operation of the system, which has been explained in connection with the various elements and which it is believed is now well understood, the invention claimed is:

1. In a system for measuring depths, a sound producing mechanism disposed to impart a sound wave to a ship's skin comprising a striking body, means for operating said striker, a diaphragm having a central boss upon which the striker strikes, an extension of said boss on the other side of said diaphragm and non-yielding metallic means disposed between and loosely contacting with said second boss and said ship's skin.

2. In combination with an impact oscillator having a striking element having a diaphragm disposed to be struck from within by the striking element, a ship's skin, means for mounting said oscillator near the ship's skin and an unattached non-yielding metallic element interposed between the diaphragm and the ship's skin in a position substantially opposite where the striking element hits the diaphragm.

3. In combination with an impact oscillator having a striking element having a diaphragm disposed to be struck from within by the striking element, a ship's skin, means for mounting said oscillator near the ship's skin and an unattached non-yielding metallic element interposed between the diaphragm and the ship's skin and positioned opposite the place where the striking element meets the diaphragm.

4. In combination with an impact oscillator having a striking element having a diaphragm disposed to be struck from within by the striking element, a ship's skin, means for mounting said oscillator near said ship's skin, means projecting beyond the forward surface of the diaphragm, a metallic cap covering said projecting means on the one side and abutting against the ship's skin on the other side.

5. In combination with an impact oscillator having a striking element having a diaphragm disposed to be struck from within by the striking element, a ship's skin, means mounting said oscillator near said ship's skin including a bridge element having base elements attached to said skin and means for adjustably positioning said oscillator from said bridge elements, and non-yielding metallic means interposed between said diaphragm and said ship's skin in a position substantially opposite where the striking element hits the diaphragm for making contact between the same, the position of the oscillator being adjustable to obtain the desired contact.

6. In combination with an impact oscillator having a striking element having a diaphragm disposed to be struck from within by the striking element, a ship's skin, means mounting said oscillator near said ship's skin including a bridge element having base elements attached to said skin, a plurality of symmetrically positioned supporting rods extending from said oscillator, said rods being threaded to engage corresponding threaded portions in said bridge element and non-yielding metallic means interposed between said diaphragm and said ship's skin in a position substantially opposite where the striking element hits the diaphragm for making contact between the same.

EDWIN E. TURNER, Jr.